US012800553B2

(12) United States Patent
Hirao et al.

(10) Patent No.: US 12,800,553 B2
(45) Date of Patent: Nov. 17, 2026

(54) SONIC INSPECTION DEVICE, SONIC INSPECTION METHOD, AND HOLDER FOR SONIC INSPECTION DEVICE

(71) Applicants: KABUSHIKI KAISHA TOSHIBA, Tokyo (JP); TOSHIBA ENERGY SYSTEMS & SOLUTIONS CORPORATION, Kawasaki (JP)

(72) Inventors: Akiko Hirao, Kawasaki Kanagawa (JP); Noriko Yamamoto, Yokohama Kanagawa (JP); Kohei Nara, Yokohama Kanagawa (JP); Syuhei Suzuki, Saitama Saitama (JP); Tomio Ono, Yokohama Kanagawa (JP); Yutaka Nakai, Yokohama Kanagawa (JP); Takashi Kumata, Kawasaki Kanagawa (JP); Hirofumi Ueno, Ebina Kanagawa (JP)

(73) Assignees: KABUSHIKI KAISHA TOSHIBA, Tokyo (JP); TOSHIBA ENERGY SYSTEMS & SOLUTIONS CORPORATION, Kawasaki (JP)

( * ) Notice: Subject to any disclaimer, the term of this patent is extended or adjusted under 35 U.S.C. 154(b) by 406 days.

(21) Appl. No.: 18/464,518

(22) Filed: Sep. 11, 2023

(65) Prior Publication Data

US 2024/0219354 A1 Jul. 4, 2024

(30) Foreign Application Priority Data

Jan. 4, 2023 (JP) ................................ 2023-000144

(51) Int. Cl.
*G01N 29/28* (2006.01)
*G01N 29/04* (2006.01)
(Continued)

(52) U.S. Cl.
CPC ............ *G01N 29/28* (2013.01); *G01N 29/04* (2013.01); *G01N 29/223* (2013.01);
(Continued)

(58) Field of Classification Search
CPC ............ G01N 29/223; G01N 29/2462; G01N 29/2468; G01N 29/28; G01N 29/225; G01N 29/226; G10K 11/30
See application file for complete search history.

(56) References Cited

U.S. PATENT DOCUMENTS 3,979,946 A * 9/1976 Cipywnyk ............ G01N 29/28 73/635
5,760,308 A * 6/1998 Beall ...................... G01N 29/07 73/598
(Continued)

FOREIGN PATENT DOCUMENTS

CN 110646517 A * 1/2020 .......... G01N 29/223
JP H03110463 A * 5/1991 ............ G01N 29/24
(Continued)

OTHER PUBLICATIONS

U.S. Appl. No. 18/460,083, filed Sep. 1, 2023, Kabushiki Kaisha Toshiba et al.
(Continued)

*Primary Examiner* — David L Singer
(74) *Attorney, Agent, or Firm* — Foley & Lardner LLP

(57) ABSTRACT

A sonic inspection device for enabling both smooth sliding of a sonic probe under no load and highly efficient sound transmission under load, includes the sonic probe having a sonic function surface, a couplant including an elastomer, and a sheet member containing a polymer and having a plurality of openings, and a holder. The holder holds the couplant to attach the couplant to the sonic probe.

11 Claims, 12 Drawing Sheets

(51) Int. Cl.
*G01N 29/22* (2006.01)
*G01N 29/24* (2006.01)

(52) U.S. Cl.
CPC ... *G01N 29/2437* (2013.01); *G01N 2291/023* (2013.01); *G01N 2291/101* (2013.01)

(56) References Cited

U.S. PATENT DOCUMENTS

| | | | | |
|---|---|---|---|---|
| 6,302,314 | B1 * | 10/2001 | Horio | G01N 29/11 228/103 |
| 6,412,344 | B1 | 7/2002 | Danicich et al. | |
| 6,497,159 | B1 * | 12/2002 | Lavoie | G01N 29/225 73/866.5 |
| 10,794,871 | B1 * | 10/2020 | Blackshire | G01N 29/265 |
| 2007/0044562 | A1 * | 3/2007 | Sarr | B33Y 40/00 73/618 |
| 2007/0175282 | A1 * | 8/2007 | Fetzer | G01N 29/28 73/628 |
| 2012/0029393 | A1 | 2/2012 | Lee | |
| 2018/0059064 | A1 * | 3/2018 | Tat | B23P 19/00 |
| 2020/0086347 | A1 * | 3/2020 | Hirao | B06B 1/064 |
| 2021/0123890 | A1 | 4/2021 | Hirao et al. | |
| 2022/0291174 | A1 | 9/2022 | Hirao et al. | |
| 2023/0079884 | A1 | 3/2023 | Yamamoto et al. | |

FOREIGN PATENT DOCUMENTS

| | | | | |
|---|---|---|---|---|
| JP | H0618501 | A * | 1/1994 | C04B 41/48 |
| JP | 2004212308 | A * | 7/2004 | G01N 29/10 |
| JP | 2020-053956 | A | 4/2020 | |
| JP | 2021-067603 | A | 4/2021 | |
| JP | 2022-141589 | A | 9/2022 | |
| JP | 2023-043816 | A | 3/2023 | |

OTHER PUBLICATIONS

European Search Report issued in the corresponding EP Application No. 23196522.9. dated May 29, 2024 (9 pages).
Japanese Office Action for JP Appl. Ser. No. 2023-000144 dated Jan. 6, 2026 (9 pages).

* cited by examiner

SONIC INSPECTION DEVICE, SONIC INSPECTION METHOD, AND HOLDER FOR SONIC INSPECTION DEVICE

CROSS REFERENCE TO RELATED APPLICATION

This application is based upon and claims the benefit of priority from Japanese Patent Application No. 2023-000144, filed on Jan. 4, 2023; the entire contents of which are incorporated herein by reference.

FIELD

Embodiments disclosed herein relate to a sonic inspection device, a sonic inspection method, and a holder for a sonic inspection device.

BACKGROUND

A sonic inspection device using the propagation of a sound wave such as an ultrasonic wave and an elastic wave is used for inspecting various members, devices, infrastructures, and so on. An ultrasonic inspection device is also used for medical diagnosis and the like. In the case where a probe for sonic inspection used in such inspection devices, such as a sonic receiver, a sonic transmitter, or a sonic transceiver represented by an ultrasonic probe, an AE (Acoustic Emission) sensor, or the like is installed on an object to be inspected, a liquid or viscous couplant such as glycerin, vaseline, or oil is interposed between the object to be inspected and a sonic function surface, of the probe, that functions as at least one of surfaces for transmitting a sound wave and for receiving a sound wave so that the sound wave is efficiently propagated between the probe for sonic inspection and the object to be inspected. This is because, if air which is greatly different in acoustic impedance from a material forming the probe and a material forming the object to be inspected is present between these materials, it reflects sound, making the propagation of the sound difficult.

The aforesaid couplant efficiently transmits the sound wave such as an ultrasonic wave from the probe to the object to be inspected or from the object to be inspected to the probe and thus is important for increasing test accuracy. However, the processes of applying and removing the liquid or viscous couplant are troublesome. This is a factor to increase the inspection time and man-hours. Some objects to be inspected may be contaminated by the couplant, and in this case, the inspection itself cannot be conducted.

A solid couplant has also been proposed, but it is far inferior in ultrasonic propagation to the liquid couplant. A solid couplant having tackiness has also been proposed to avoid the presence of air between an installation surface of the couplant for sonic inspection and an object to be inspected. In the case where a conventional solid couplant having tackiness is used, however, the installation surface of the couplant for sonic inspection comes into close contact with the object to be inspected, and the couplant for sonic inspection cannot be slid. This necessitates once peeling the probe together with the couplant from the object to be inspected even when its installation position has to be moved only by a small distance, leading to the complication of the inspection process. Another problem is that some holding form of the solid couplant on the probe necessitates a lot of time and trouble for changing the couplants.

DETAILED DESCRIPTION

A sonic inspection device of an embodiment includes: a sonic probe including a transducer configured to execute at least one of transmission and reception of a sound wave, the sonic probe having a sonic function surface constituting at least one of surfaces for transmitting the sound wave and for receiving the sound wave; a couplant that includes an elastomer and a sheet member containing a polymer and having a plurality of openings, the elastomer having a first surface that comes into contact with the sonic function surface of the sonic probe directly or through an intermediate member and a second surface opposite the first surface, and the sheet member being stacked with the elastomer while in contact with the second surface; a holder that holds the couplant to attach the couplant to the sonic probe and to which the sheet member having the plurality of openings is partly fixed while the sheet member having the plurality of openings is at least partly located at an outermost surface under no load condition or under loaded condition; and a loading mechanism that applies a load to the sonic probe.

A sonic inspection device, a sonic inspection method, and a holder for a sonic inspection device of embodiments will be hereinafter described with reference to the drawings. In the embodiments, substantially the same constituent parts will be denoted by the same reference signs and a description thereof may be partly omitted. The drawings are schematic, and a relation between the thickness and the planar dimension of each part, a thickness ratio among the parts, and so on may be different from actual ones. In the description, a term expressing the up-down direction indicates a relative direction when an inspection surface of an object to be inspected is defined as an upper side, and may differ from an actual direction based on a gravitational acceleration direction.

A sound wave mentioned here is a generic name for all the elastic vibration waves propagated in an elastic body regardless of whether it is gas, liquid, or solid and includes not only sound waves in an audible frequency range but also ultrasonic waves having frequencies higher than the audible frequency range, low-frequency sounds having frequencies lower than the audible frequency range, and so on. The frequency of the sound wave is not limited and includes high frequencies to low frequencies.

First Embodiment

Figure 1:
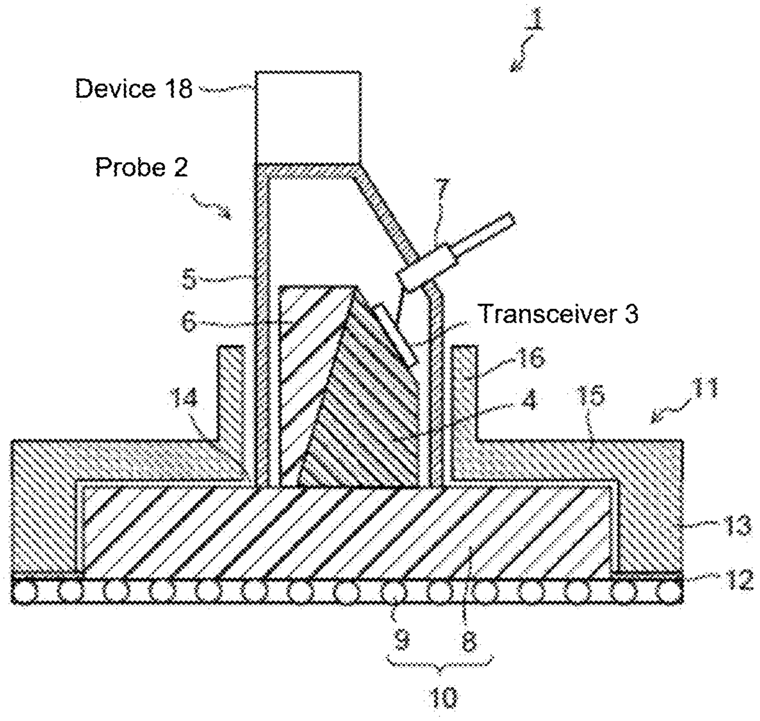
FIG. 1 is a sectional view illustrating a sonic inspection device of a first embodiment.
Figure 2:
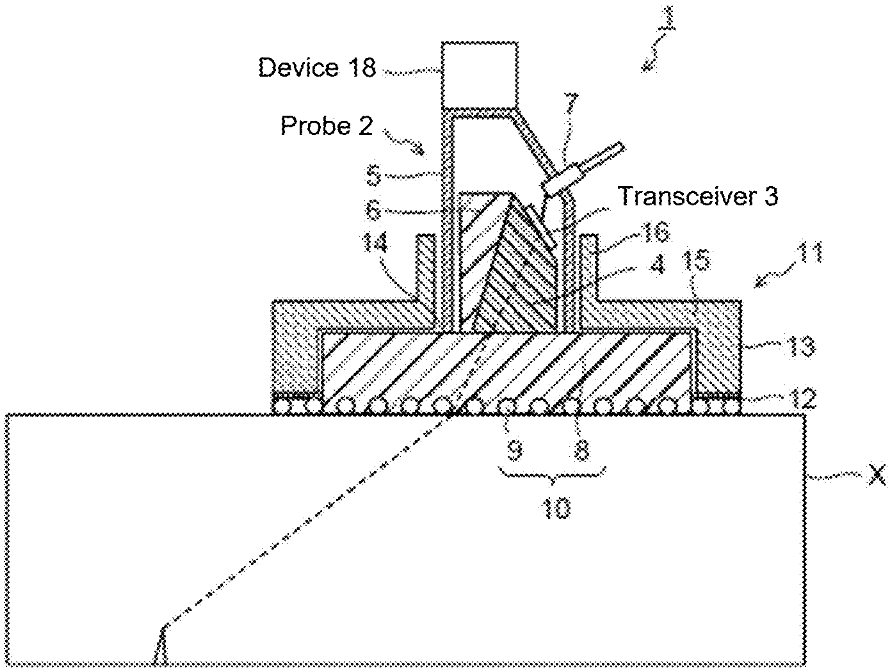
FIG. 2 is a view illustrating the step of inspecting an object to be inspected using the sonic inspection device illustrated in FIG. 1.

FIG. 1 illustrates a sonic inspection device 1 of a first embodiment, and FIG. 2 illustrates an inspection state in which the sonic inspection device 1 is placed on an object X to be inspected. The sonic inspection device 1 illustrated in FIG. 1 includes an angle sonic probe 2. The sonic probe 2 that the sonic inspection device 1 has is, for example, of a pulse-echo type, and performs a nondestructive inspection such as flaw detection, film thickness measurement, or the like by measuring a sound wave (reflected wave) returning from an inspection target such as a flaw in the object X to be inspected. Instead, the sonic probe 2 may perform a nondestructive inspection such as flaw detection by measuring a sound wave such as a pressure wave generated by an inspection target. The sonic probe 2 has at least one of the functions of transmitting and receiving the sound wave, and specific examples thereof include an ultrasonic transceiver (ultrasonic transducer) and a sonic receiver. Typical examples of the ultrasonic transceiver include an ultrasonic probe. Typical examples of the sonic receiver include an AE sensor. The sonic probe 2 may be a sonic transmitter.

In the sonic inspection device 1 of the embodiment, the sonic probe 2 has a transceiving surface, a receiving surface, a transmitting surface, and so on for a sound wave. Here, a surface constituting at least one of the sound wave transmitting surface and receiving surface of the sonic probe will be called a sonic function surface. The sonic probe 2 having such a sonic function surface is an ultrasonic probe as an ultrasonic transceiver, for instance. The ultrasonic probe 2 includes an ultrasonic transceiving element 3 having a transducer (piezoelectric body) for ultrasonic flaw detection and electrodes provided on the upper and lower surfaces of the transducer. The angle ultrasonic transceiving element 3 is disposed on a shoe 4 having a predetermined angle and, in this state, is housed in a case 5. The ultrasonic transceiving element 3 is disposed on a wave receiving plate as required. A sound absorbing material 6 is provided on the rear side of the shoe 4. The not-illustrated electrodes of the ultrasonic transceiving element 3 are electrically connected to a connector 7 provided on the case 5. The constituent materials, structures, and so on of the transducer, the ultrasonic transceiving element 3, the shoe 4, the wave receiving plate, and so on may be those in known ultrasonic probes and are not limited.

In the case where the sonic probe 2 is a sonic receiver such as an AE sensor, the same configuration as that of the ultrasonic probe 2 is employed except that a sonic receiving element having a transducer (piezoelectric body) for AE reception is used. In this case, the constituent materials, structures, and so on of the transducer for AE reception, the sonic receiving element, the wave receiving plate, and so on may be those of known transducers for AE reception.

In the sonic inspection device 1 of the embodiment, in the case where the sonic probe 2 is an ultrasonic probe having at least one of the functions of transmitting and receiving a sound wave, it may have the shoe 4 made of a polymeric material or an intermediate member called a retarder. As illustrated in FIG. 1, in the angle ultrasonic probe 2, the transducer is installed on a material forming the shoe 4. As the material of the shoe, acrylic, polystyrene, polyetherimide, or the like is used. In the case of a normal ultrasonic probe, the transducer is installed on an intermediate member called a retarder as will be described later. The shoe made of the polymeric material or the intermediate member called the retarder is in contact with the sonic function surface of the ultrasonic probe 2, for instance. Further, on the outer peripheral surface functioning as at least one of the sound wave transmitting surface and receiving surface of the intermediate member, a couplant 10 including a elastomer 8 to function as a sonic propagating part and a sheet member 9 containing a polymer and having a plurality of openings is provided.

The couplant 10 including the elastomer 8 and the sheet member 9 having the openings is held by a holder 11 and in this state, is attached to the sonic probe 2. The couplant 10 is partly fixed to the holder 11. The sheet member 9 having the openings is partly bonded and fixed to the holder 11 through an adhesive sheet 12. The sonic inspection device 1 is placed on the object X to be inspected with the couplant 10 in contact with the object X to be inspected. The sonic inspection device 1 is, for example, of a pulse-echo type and measures a sound wave coming from the object X to be inspected to perform a nondestructive inspection of a flaw or the like in the object X to be inspected. The couplant 10 includes the elastomer 8 and the sheet member 9 containing the polymer and having the openings. The sheet member 9 is provided on a contact surface where the elastomer 8 is to come into contact with the object to be inspected.

When the sonic inspection device 1 is used, the holder 11 holding the couplant 10 is mounted on the sonic probe 2. In the sonic inspection device 1 illustrated in FIG. 1, the holder 11 has a sidewall part (base member) 13 provided to surround the couplant 10, a cover part 15 covering the upper side of the sidewall part 13 and having an opening part 14, and a pressing part 16 surrounding the opening part 14 and extending upward in the same shape as that of the opening part 14. The opening part 14 is provided from the inside of the sidewall part 13 up to the inside of the pressing part 16. The adhesive sheet 12 is placed on the bottom of the sidewall part 13, and through the adhesive sheet 12, the sheet member 9 having the openings is partly bonded and fixed to the holder 11. The sonic probe 2 is movably inserted in the opening part 14 formed in the holder 11.

Figure 5:
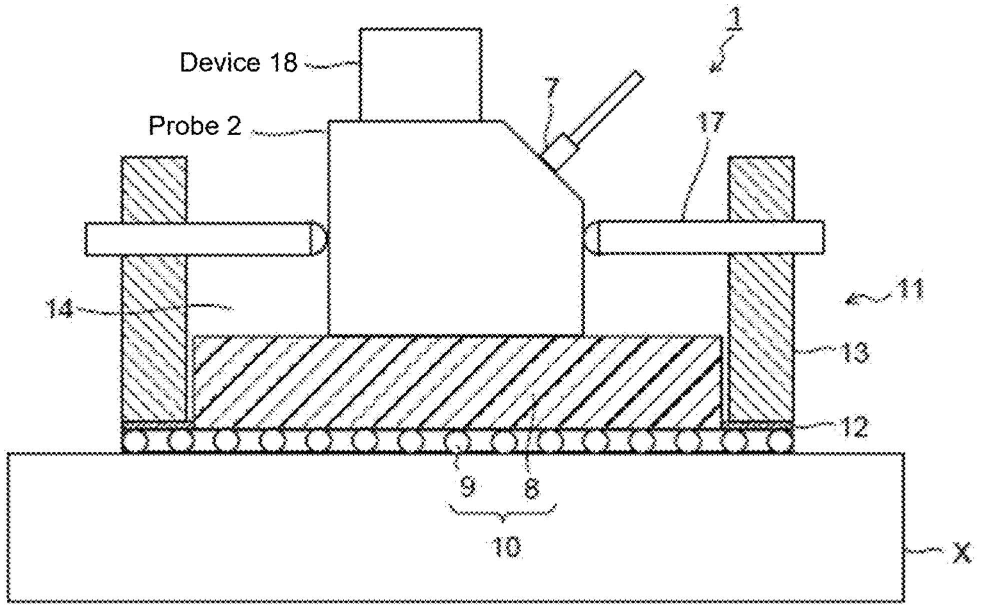
FIG. 5 is a sectional view illustrating a modification example of the sonic inspection device of the first embodiment.

The sonic probe 2 may be in a state of being only inserted in the pressing part 16 and the opening part 14 when used, or when it is used, the holder 11 may be fixed to and integrated with the sonic probe 2 using mechanisms such as plungers 17 as illustrated in FIG. 5. The holder 11 illustrated in FIG. 5 has a sidewall part 13 provided to surround the couplant 10, and the plungers 17 are provided on the sidewall part 13. The plungers 17 are disposed and fixed in through holes provided in the sidewall part 13 (or the pressing part 16) of the holder 11, and fix the sonic probe 2 in a state where the sonic probe 2 is movable up and down and attachable/detachable, by pressing balls or pins at their tips against the sonic probe 2 by springs or the like provided inside.

The holder 11 illustrated in FIG. 1 has the opening part 14 where to insert the sonic probe 2. The holder 11 further has, in its bottom, a space where to house the elastomer 8, and the sheet member 9 having the openings is placed on the bottom with the adhesive sheet 12 therebetween. The sonic inspection device 1 illustrated in FIG. 5 is an example including a couplant 10 and a holder 11 applicable to angle sonic probes 2 with various sizes. On the peripheral part of the holder 11, mechanisms for holding the sonic probe 2 are provided, and the holder 11 holding the couplant 10 is mountable on the sonic probes 2 having different sizes and shapes.

Figure 3:
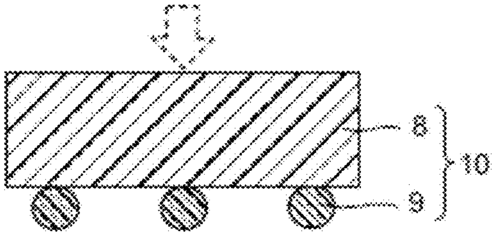
FIG. 3 is a view illustrating a state of a couplant that includes an elastomer and a sheet member having a plurality of openings in the sonic inspection device illustrated in FIG. 1 under no load condition.

The elastomer 8 is in close contact with the sonic function surface of the sonic probe 2, and as illustrated in FIG. 3, in the initial state (under no load condition), the sheet member 9 containing the polymer and having the openings, which is fixed to the holder 11, is located at a surface that is in contact with the object X to be inspected. The sheet member 9 having the openings is located at an outermost surface of the sonic inspection device 1. The outermost surface mentioned here means the contact surface with the object X to be inspected and is an outermost surface opposite the sonic probe 2 of the sonic inspection device 1. Since the sheet member 9 having the openings is partly fixed to the holder 11, it is possible to easily slide the sonic probe 2 integrated with the couplant 10 and the holder 11, on the object X to be inspected.

Figure 4:
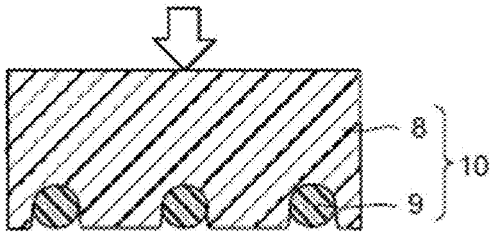
FIG. 4 is a view illustrating a state of the couplant that includes the elastomer and the sheet member having the openings in the sonic inspection device illustrated in FIG. 1 under loaded condition.

When the sonic inspection is conducted, a load applying device 18 applies a load P to the sonic probe 2. As a result, the load P is applied to the elastomer 8 in contact with the sonic function surface of the sonic probe 2. As illustrated in FIG. 4, the elastomer 8 is pressed against the sheet member 9 containing the polymer and having the openings, which is partly fixed to the holder 11. Since the sheet member 9 having the openings is partly fixed to the holder 11, the elastomer 8 is filled in meshes of the sheet member 9 having the openings to spread out toward the object X to be inspected, and air present between the object X to be inspected and the couplant 10 is expelled, so that the elastomer 8 comes into direct contact with the object X to be inspected. This allows the sound wave such as an ultrasonic wave to be propagated from the sonic probe 2 to the object X to be inspected.

The load applying device 18 is an actuator of a mechanical type, a hydraulic type, a pneumatic type, an electromagnetic type, or the like. The load applying device 18 is installed on the sonic probe 2 and is configured to apply the load directly to the sonic probe 2 to thereby apply the load to the couplant 10 through the sonic probe 2. The mechanism 18 for applying the load to the sonic probe 2 and the couplant 10 may be any as long as it is capable of switching between the state of applying the load to the couplant 10 and the state where the load is removed, and its load applying method, the shape of its load applying member, and so on are not limited to specific ones. When the load applied by the load applying device 18 is removed, the deformation of the elastomer 8 caused by the load is alleviated, so that the sheet member 9 having the openings changes to be mainly present on the interface with the object X to be inspected. This makes it possible to easily slide the sonic probe 2 integrated with the couplant 10 and the holder 11, on the object X to be inspected again.

As described above, by fixing part of the couplant 10 including the elastomer 8 and the sheet member 9 containing the polymer and having the openings to the holder 11, it is possible to efficiently propagate the sound wave between the couplant 10 and the object X to be inspected when the load is applied, and to move the sonic probe 2 integrated with the couplant 10 and the holder 11 on the object X to be inspected when the load is removed. Because of these, the nondestructive inspection by the sonic inspection device 1 and the movability of the sonic inspection device 1 are both achieved. Here, the holder 11 may be a resin member, a metal member, or the like formed with a 3D printer or the like, and may be a member formed of any of various materials, such as a member worked from wood, resin, metal, glass, or a composite material of these.

A measured value of the frictional force of the elastomer forming the elastomer 8 is overwhelmingly larger than those of other materials. It is inferred that this large frictional force comes from the phenomenon that is observed as a result of a great increase in its contact area when the elastomer deforms. Even if hard materials such as metals are tried to be brought into contact with each other, only tips of uneven parts of the contact surfaces, specifically, tips of minute projections which occupy only a minute part of the contact surfaces, come into contact. On the other hand, a material with a low modulus of elasticity such as the elastomer comes to have a large contact area even under the same load, and thus its adsorption force increases owing to the large contact area. Further, the viscoelasticity of the elastomer acts to increase the force of peeling off the adsorption interface with which it is in contact, which will be a factor to increase the coefficient of friction. Being thus large in practical (microscopic) contact area with the object X to be inspected, the elastomer can transmit an ultrasonic wave well. However, one that more easily transmits the ultrasonic wave has a larger frictional force and thus is more difficult to peel off.

Therefore, in the couplant 10 and the holder 11 illustrated in FIG. 1, the sheet member 9 containing the polymer and having the openings is provided on the surface of the elastomer 8. The sheet member 9 having the openings is formed of a material having a higher modulus of elasticity than that of the elastomer 8. The sheet member 9 having the openings is partly fixed to the holder 11. When the holder 11 holding the couplant 10 including such a elastomer 8 and such a sheet member 9 having the openings is used, under no-load condition, bulges of an uneven part of the surface of the sheet member 9 having the openings and having a high modulus of elasticity are in contact with the object X to be inspected, and the elastomer 8 is not in contact with the object X to be inspected, allowing the movement with a small frictional force. Under loaded condition, the elastomer 8 deforms to stick out between the bulges of the sheet member 9 having the openings and comes into contact with the object X to be inspected, enabling the efficient propagation of the sound wave.

In the sheet member 9 containing the polymer and having the openings, in the case where the sheet member 9 is a mesh sheet, the diameter of yarns forming the bulges, that is, forming the mesh, is preferably not less than 10 μm nor more than 500 μm. In the case where the sheet member 9 is a sheet in which the openings are formed, the distance between the openings is preferably not less than 10 μm nor more than 500 μm. This was found out from the measurement of sound propagation performance under loaded condition and a coefficient of friction with the object X to be inspected under no load condition. If the sheet member 9 having the openings departs from this range, sonic propagation performance tends to decrease or lubricity on the object X to be inspected tends to be worse. The width between the bulges, that is, the major axis of each aperture of the mesh sheet or each opening of the sheet in which the openings are formed is preferably not less than 10 μm nor more than 2000 μm. If the minimum width between the bulges, that is, the minimum major axis of the apertures of the sheet or the openings of the sheet in which the openings are formed is over 2000 μm, in both cases, it may not be possible to sufficiently obtain the effect of reducing the frictional force ascribable to the contact of only the bulges with the object X to be inspected under no load condition. If the width between the bulges, that is, the minimum width of the apertures of the mesh or the major axis of the opening of the sheet is less than 10 μm, it may not be possible to bring the elastomer 8 into sufficient contact with the object X to be inspected under loaded condition.

Further, in the couplant 10 including the elastomer 8 and the sheet member 9 containing the polymer and having the openings, portions, of the uneven part, that come into contact with the object X to be inspected are defined as bulges. In a view of the surface having the uneven structure seen from the normal direction, the total area of indents (the area of these portions projected on a plane) is preferably larger than the total area of the bulges (the area of these portions projected to a plane). This can enhance the sonic propagation efficiency between the elastomer 8 and the object X to be inspected. It is preferable to appropriately select the minimum width of the bulges, the minimum width of the indents, the ratio of the total area of the bulges and the total area of the indents, and so on according to the Young's modulus and the acoustic impedance of the material used in the elastomer 8.

The thickness of the elastomer 8 is preferably not less than 10 μm nor more than 10 mm. The appropriate thickness of the elastomer 8 differs depending on the acoustic impedance and the Young's modulus of the material forming the elastomer 8, but especially when the thickness is not less than about 0.2 mm nor more than about 2 mm, sonic propagation performance is high, and it is also possible to increase lubricity on the object X to be inspected. The elastomer contained in the constituent material of the elastomer 8 includes a thermosetting elastomer and a thermoplastic elastomer, and either of these is usable in the elastomer 8 of the embodiment. The thermoplastic elastomer is a copolymer of two kinds or more of polymers whose moduli of elasticity are different in temperature dependence, for instance. Since the elastomer used in the embodiment has a certain level of viscoelasticity and can stick to a target, it contaminates the surroundings less than other couplants such as water and oil, and being solid, it can be removed easily and is reusable. Since the elastomer 8 expels the air layer when pressed, the elastic constant (Young's modulus) of the used elastomer is preferably not less than 0.1 MPa nor more than 0.1 GPa. Its yield stress which is a stress at which the plastic deformation of a material starts is preferably large, and is preferably 2 MPa or more, and more preferably 20 MPa or more. Its tensile strength is also preferably large and is preferably 2 MPa or more.

Examples of the thermoplastic elastomer mainly forming the elastomer 8 include a polystyrene-based thermoplastic elastomer (SBC, TPS), a polyolefin-based thermoplastic elastomer (TPO), a vinyl chloride-based thermoplastic elastomer (TPVC), a polyurethane-based thermoplastic elastomer (TPU), a polyester-based thermoplastic elastomer (TPEE, TPC), and a polyamide-based thermoplastic elastomer. Examples of the thermosetting elastomer include: styrene-butadiene rubber (SBR), isoprene rubber (IR), butadiene rubber (BR), chloroprene rubber (CR), and acrylonitrile-butadiene rubber (NBR) which are classified as diene rubber; butyl rubber such as isobutylene-isoprene rubber (IIR), ethylene-propylene rubber (EPM), ethylene-propylene-diene rubber (EPDM), urethane rubber (U), silicone rubber, and fluorine rubber (FKM) which are classified as non-diene rubber; and other rubber such as chlorosulfonated polyethylene (CSM), chlorinated polyethylene (CM), acrylic rubber (ACM), polysulfide rubber (T), and epichlorohydrin rubber (CO, ECO). Since these materials have different properties such as heat resistance, abrasion resistance, oil resistance, chemical resistance, and so on, it is preferable to select an appropriate material for each object to be inspected. Depending on the use, a mixture of a plurality of elastomers may be used. An additive having a size not preventing the transmission of a sound wave, specifically, having a diameter of approximately 200 μm or less may be mixed.

While no load is applied, the member 9 containing the polymer and having the openings can be slid on the object X to be inspected owing to the bulges of the uneven structure of the sheet member 9 having the openings. This is because the material forming the sheet member 9 having the openings is harder than the material forming the elastomer 8, and its bulges have a shape with a small contact area with the object X to be inspected. The sheet member 9 having the openings, in which the bulges are formed, is often made of mainly a polymer material. As the polymer material, a polymer higher in modulus of elasticity than the elastomer mainly forming the elastomer 8 is used. Examples thereof include polyester, polyethylene, polypropylene, nylon, fluororesins such as trifluoroethylene chloride, tetrafluoroethylene, a tetrafluoroethylene-hexafluoropropylene copolymer, a tetrafluoroethylene-ethylene copolymer, and vinylidene fluoride, an ABS resin, polystyrene, a methacrylic resin, polycarbonate, polyacetal, polyurethane, polyvinylidene chloride, polyethylene terephthalate, liquid crystal, and polyvinyl chloride. Any of various kinds of polymer meshes to which metal or the like is sputtered may also be used. One containing other materials such as metal, ceramic, and oxide may be used.

In the case where the sheet member 9 containing the polymer and having the openings, which is included in the couplant 10, is a mesh sheet, the mesh sheet is not limited to what is called a plain weave one formed of warp yarns and weft yarns alternately crossing over each other. It may be a twill weave one formed of warp yarns and weft yarns with the weft yarns each crossing over every two warp yarns, or may be a satin weave one. Further, one in which warp yarns and weft yarns are not orthogonally knitted, and for example, one in which the warp yarns are inclined by about 20 degrees may be used. Further, one in which mesh intersections are fused is desirable because it increases the strength of the sheet member 9 having the openings. Moreover, when such a sheet member 9 is combined with the elastomer 8 to form the couplant 10, the sonic propagation performance sometimes becomes high.

Second Embodiment

Figure 6:
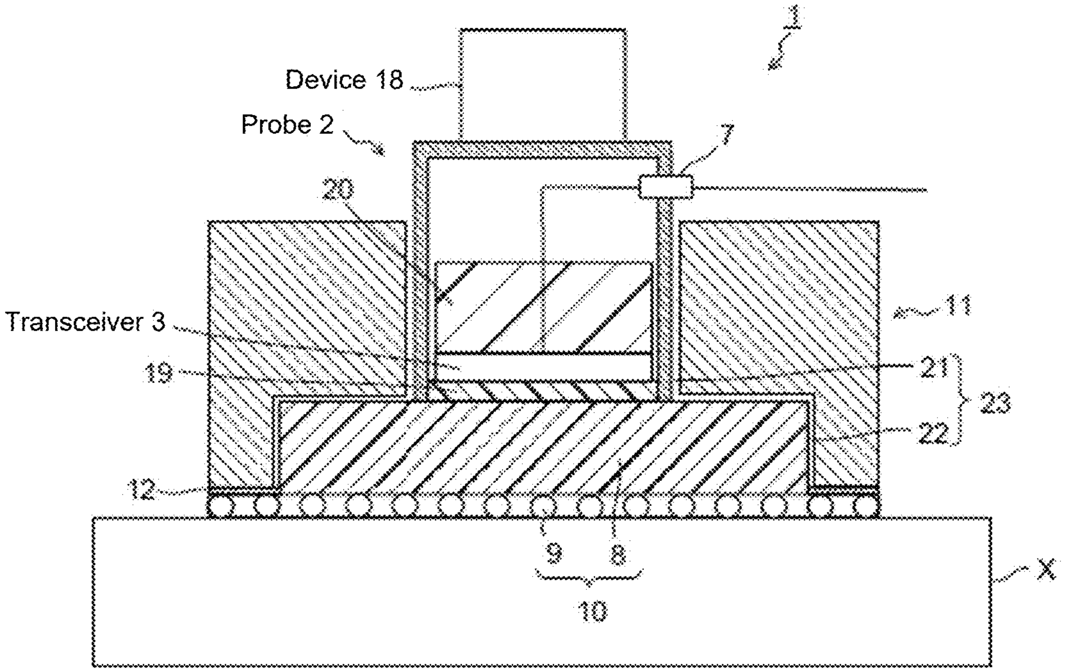
FIG. 6 is a sectional view illustrating a first example of a sonic inspection device of a second embodiment.
Figure 7:
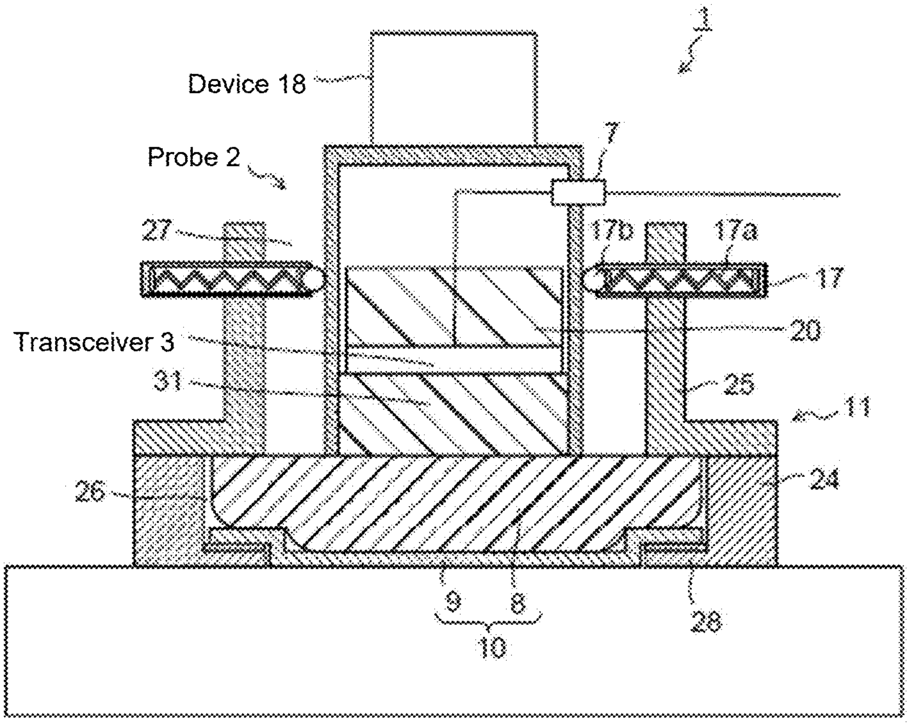
FIG. 7 is a sectional view illustrating a second example of the sonic inspection device of the second embodiment.

FIG. 6 illustrates a sonic inspection device 1 of a second embodiment. The sonic inspection device 1 illustrated in FIG. 6 includes a normal sonic probe 2. The sonic probe 2 that the sonic inspection device 1 has is, for example, of a pulse-echo type and performs a nondestructive inspection such as flaw detection, film thickness measurement, or the like by measuring a sound wave (reflected wave) returning from an inspection target such as a flaw in an object to be inspected. Instead, the sonic probe 2 may perform a nondestructive inspection such as flaw detection by measuring a sound wave such as a pressure wave generated by an inspection target. The sonic probe 2 has at least one of the functions of transmitting and receiving the sound wave, and specific examples thereof include an ultrasonic transceiver (ultrasonic transducer) and a sonic receiver. Typical examples of the ultrasonic transceiver include an ultrasonic probe. Typical examples of the sonic receiver include an AE sensor. The sonic probe 2 may be a sonic transmitter. As illustrated in FIG. 7, in the normal sonic probe 2, an ultrasonic transceiving element (or a sonic receiving element) 3 may be disposed on a retarder 31, and a damper 20 may be disposed on the ultrasonic transceiving element (or the sonic receiving element) 3. An intermediate member such as the retarder 19 is as described above.

A holder 11 illustrated in FIG. 6 includes a stepped opening part 23 having a first opening 21 where to insert the sonic probe 2 and a second opening 22 where to insert an elastomer 8 of a couplant 10. The first opening 21 and the second opening 22 communicate with each other. In a lower part of the holder 11, the second opening 22 as a space where to house the elastomer 8 is provided, and the first opening 21 as a space where to house the sonic probe 2 is provided thereabove. A sheet member 9 having a plurality of openings is bonded and fixed through an adhesive sheet 12 to the bottom of a sidewall part 13 where the first opening 21 and the second opening 22 of the holder 11 are provided.

Figure 8:
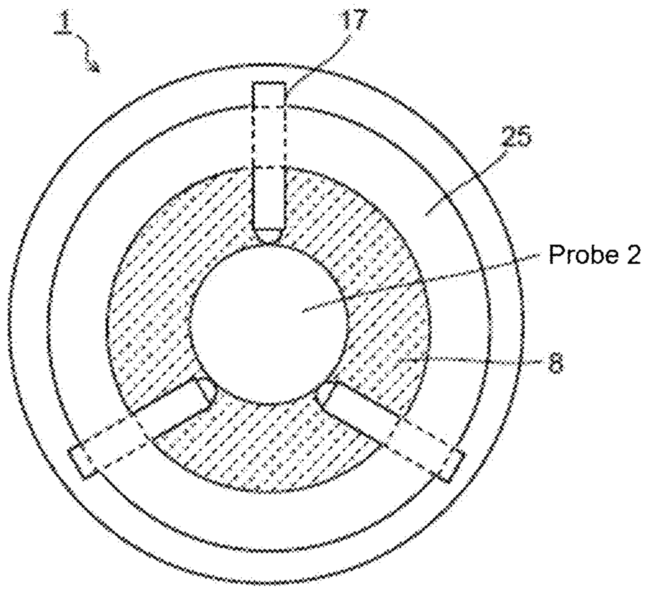
FIG. 8 is a top view of the sonic inspection device illustrated in FIG. 7.

In FIG. 6, the sonic probe 2 is in a state of being only inserted in the first opening 21 when used. As illustrated in FIG. 7 and FIG. 8, when the sonic probe 2 is used, the holder 11 may be fixed to and integrated with the sonic probe 2 using mechanisms such as plungers 17. FIG. 7 and FIG. 8 illustrate an example where the couplant 10 and the holder 11 are applicable to normal sonic probes 2 with various shapes such as a columnar shape and a rectangular parallelepiped shape and with various sizes. On the peripheral part of the holder 11, mechanisms for holding the sonic probe 2 are provided, making it possible for the holder 11 holding the couplant 10 to be mounted on the sonic probes 2 with different shapes and sizes. Here, the mechanisms for holding the sonic probe 2 are the plungers 17. For example, in the case where the sonic probe 2 is columnar as illustrated in FIG. 8, the plungers 17 are disposed to press three points dividing the outer surface of the sonic probe 2 into three. The plungers 17 each have a compression spring 17*a* provided inside and a tip member 17*b* such as a ball or a pin disposed at the tip of the compression spring 17*a*, and press the tip members 17*b* against the sonic probe 2 by the compression springs 17*a* to fix the sonic probe 2. Since the tip members 17*b* of the plungers 17 are position-variable owing to the expansion and contraction of the compression springs 17*a*, the sonic probe 2 can be attachably/detachably fixed.

The holder 11 illustrated in FIG. 7 and FIG. 8 includes a base member 24 and a pressing member 25 provided on the upper part of the base member 24. The base member 24 has a first opening part 26 constituting a space where to house the couplant 10. The pressing member 25 has a second opening part 27 constituting a space where to house the sonic probe 2. On a lower end of the first opening part 26 of the base member 24, a projecting part 28 where to place the adhesive sheet 12 is provided to extend inward. The sheet member 9 having the openings is bonded and fixed by the adhesive sheet 12 placed on the projecting part 28. Being fixed to the projecting part 28 extending inward on the lower end of the first opening 26, the sheet member 9 having the openings is kept fixed to the projecting part 28, and in this state, is bent according to the thickness of the projecting part 28 so that it is partly located at the outermost surface. The elastomer 8 is disposed in the deformed state on the sheet member 9 having the openings while in contact with such a sheet member 9 having the openings. Note that the elastomer 8 and the sheet member 9 having the openings may initially have the deformed shape and the bent shape respectively or may come to have such shapes when a load is applied. That is, the sheet member 9 having the openings may be located at the outermost surface under no load condition or may be deformed to be located at the outermost surface under loaded condition.

Figure 9:
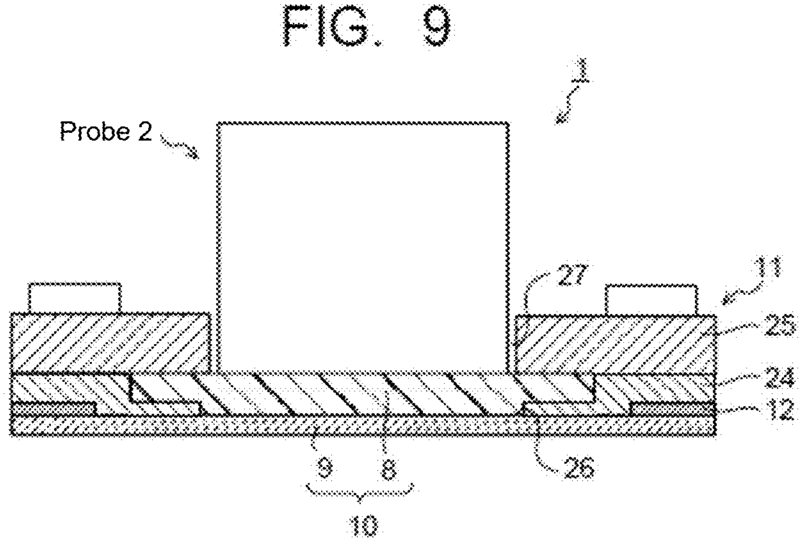
FIG. 9 is a sectional view illustrating a modification example of the sonic inspection device of the first or second embodiment.
Figure 10:
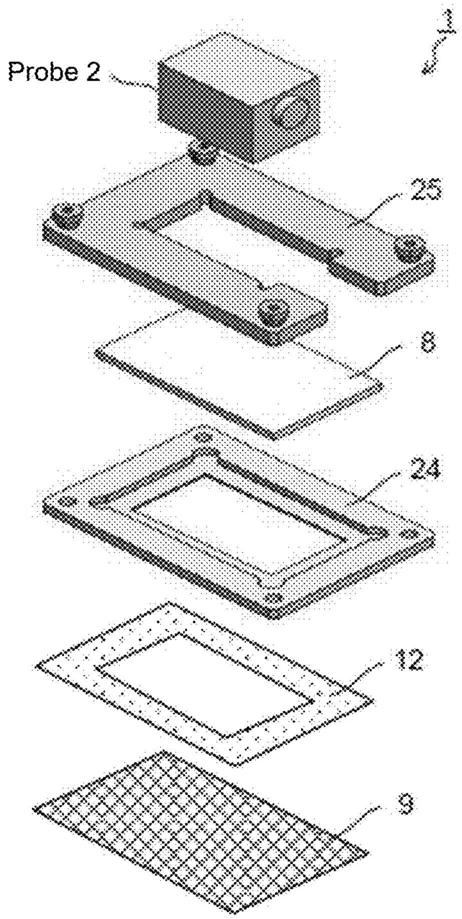
FIG. 10 is an exploded view of the sonic inspection device illustrated in FIG. 9.

As illustrated in FIG. 9 and FIG. 10, the base member 24 may have such a shape that a space where to place the adhesive sheet 12 is formed on its outer peripheral side between itself and the sheet member 9 having the openings. In FIG. 9 and FIG. 10, the sheet member 9 having the openings is placed under the base member 24, and the adhesive sheet 12 placed between the outer peripheral side of the base member 24 and the sheet member 9 having the openings bonds and fixes part of the sheet member 9 having the openings to the lower side of the base member 24. FIG. 9 is a sectional view of the sonic inspection device 1, and FIG. 10 is an exploded view of the sonic inspection device 1.

In the sonic inspection device 1 illustrated in FIG. 9 and FIG. 10, the base member 24 has a first opening part 26 constituting a space where to house the couplant 10, and the pressing member 25 has a second opening part 27 constituting a space where to insert the sonic probe 2. The space for housing the couplant 10 is constituted by the first opening part 26 larger in bottom area than the sonic probe 2. In the first opening part 26, the elastomer 8 is housed. The sheet member 9 having the openings is bonded to the bottom of the base member 24 through the adhesive sheet 12 as described above. The elastomer 8 housed in the first opening part 26 deforms by being pressed against the sheet member 9 having the openings, thereby capable of propagating a sound wave to/from an object X to be inspected. In this case, the sonic probe 2 is only housed in the second opening part 27 formed in the pressing member 25 and is not fixed to the holder 11.

Figure 11:
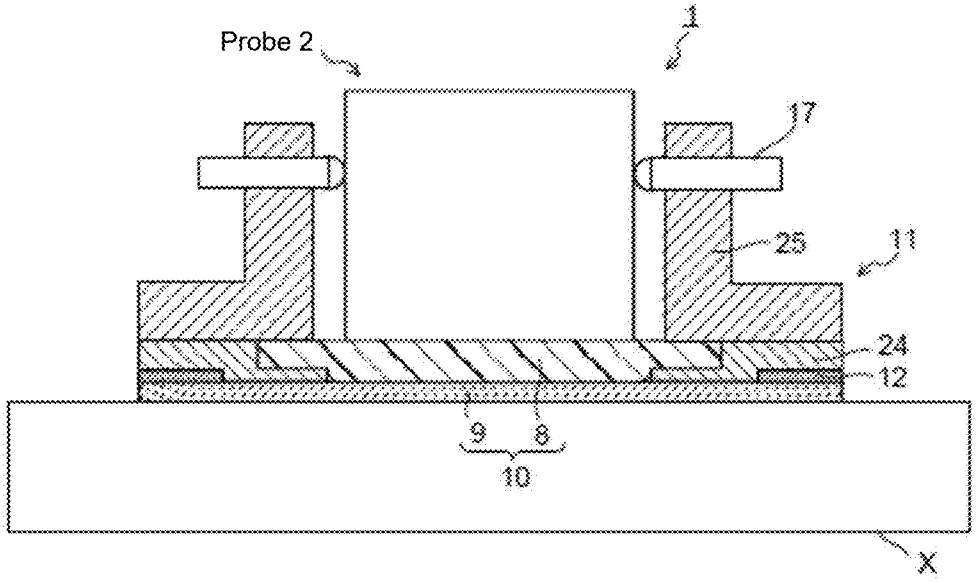
FIG. 11 is a sectional view illustrating a modification example of the sonic inspection device of the first or second embodiment.

As illustrated in FIG. 11, the sonic probe 2 in the sonic inspection device 1 may be attachably/detachably fixed by the plungers 17 provided on the pressing member 25. Fixing the sonic probe 2 by the plungers 17 provided on the pressing member 25 to integrate the couplant 10 and the holder 11 with the sonic probe 2 makes it possible to enhance the movability of the sonic inspection device 1 including the sonic probe 2, on the object X to be inspected.

Figure 12:
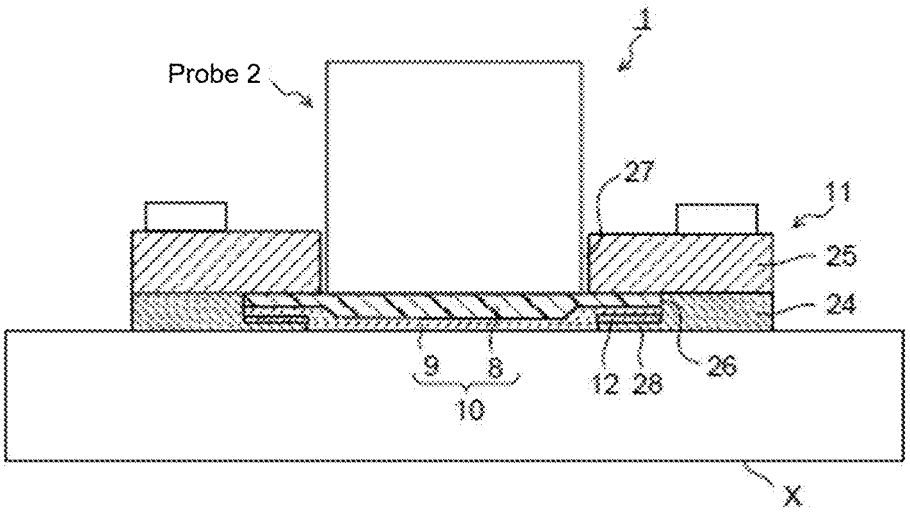
FIG. 12 is a sectional view illustrating a modification example of the sonic inspection device of the first or second embodiment.

As illustrated in FIG. 12, the holder 11 of the sonic inspection device 1 may have the projecting part 28 extending inward on the lower end of the first opening part 26 of the base member 24, and the adhesive sheet 12 placed on the projecting part 28 may bond and fix the sheet member 9 having the openings as in FIG. 7. In this case, as in FIG. 7, the sheet member 9 having the openings may have the shape bent according to the thickness of the projecting part 28 so that it is partly located at the outermost surface. The sheet member 9 having the openings may initially have the bent shape or may come to have such a shape when a load is applied. That is, the sheet member 9 having the openings may be located at the outermost surface under no load condition or may be deformed to be located at the outermost surface under loaded condition.

In the sonic inspection device 1 illustrated in FIG. 12, the couplant 10 including the elastomer 8 and the sheet member 9 having the openings is housed between the base member 24 and the pressing member 25. In this case, the sheet member 9 having the openings is preferably deformed according to the projection and recession of the base member 24. In the case where the sheet member 9 having the openings is mainly made of a thermoplastic resin, its peripheral portion is heated to be deformed upward by a dimension equal to the sum of the innermost thickness of the base member 24 and the thickness of the adhesive sheet 12, for instance. Such a deformed sheet member 9 having the openings is bonded to the base member 24 through the adhesive sheet 12.

Figure 13:
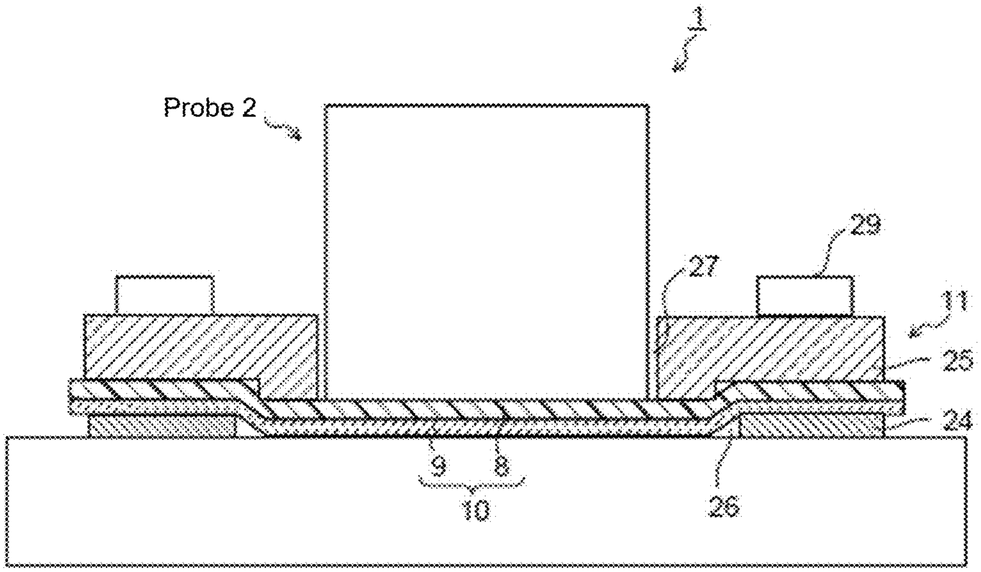
FIG. 13 is a sectional view illustrating a modification example of the sonic inspection device of the first or second embodiment.

Further, as illustrated in FIG. 13, the elastomer 8 and the sheet member 9 having the openings in the couplant 10 of the sonic inspection device 1 may be mechanically fixed by the holder 11 including the base member 24 and the pressing member 25. In the sonic inspection device 1 illustrated in FIG. 13, the elastomer 8 and the sheet member 9 having the openings are sandwiched by the base member 24 and the pressing member 25 and are mechanically fixed using mechanical fixing tools such as bolts 29 attached from the pressing member 25 side.

Figure 14:
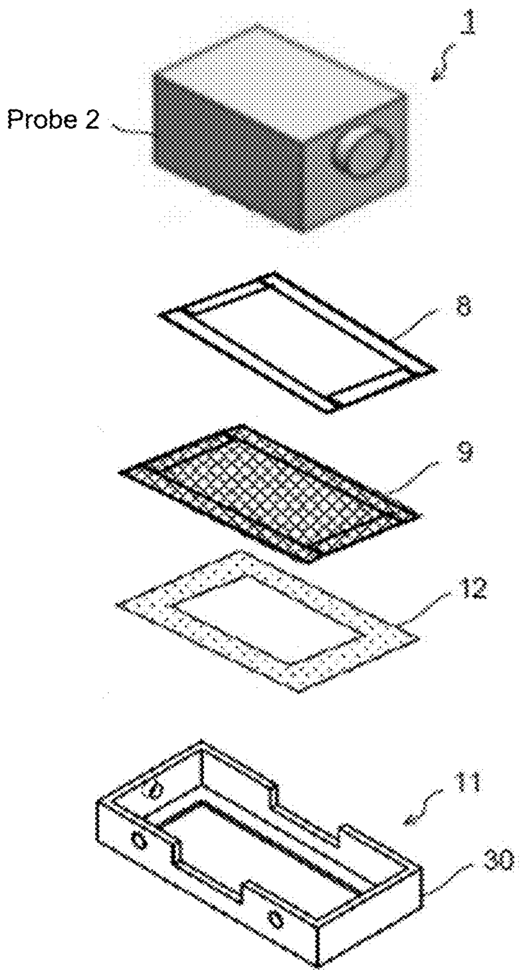
FIG. 14 is an exploded view illustrating a modification example of the sonic inspection device of the first or second embodiment.

As illustrated in FIG. 14, the sonic probe 2 and the couplant 10 are housed in the holder 11 formed of a box-shaped pressing member 30. The sheet member 9 having the openings, which is disposed in the box-shaped pressing member 30, is fixed to the box-shaped pressing member 30 using the adhesive sheet 12 or an adhesive. In this case, as in FIG. 12, the sheet member 9 having the openings is preferably housed after its peripheral part is deformed along the box-shaped pressing member 30. Consequently, in a view of the holder 11 seen from its side, it is preferable that the box-shaped pressing member 30 which is the holder 11 and the sheet member 9 having the openings are coplanar, or the sheet member 9 having the openings is dented more downward than the box-shaped pressing member 30.

The sonic probe 2, the couplant 10, the holder 11, and so on in the first embodiment and the sonic probe 2, the couplant 10, the holder 11, and so on in the second embodiment may be variously combined for use. Any of various combinations is applicable, for example, the normal sonic probe 2 may be applied to the sonic inspection device 1 illustrated in FIG. 2. Further, in the case where the surface of the object to be inspected is not flat, the holder 11 may have a curved surface having an arc-shaped cross section along the object to be inspected. In such a case, the elastomer 8 or the shoe, a protective layer, or the retarder of the sonic probe 2 are preferably worked to be along the object to be inspected by adjusting their shapes and thicknesses.

Figure 15:
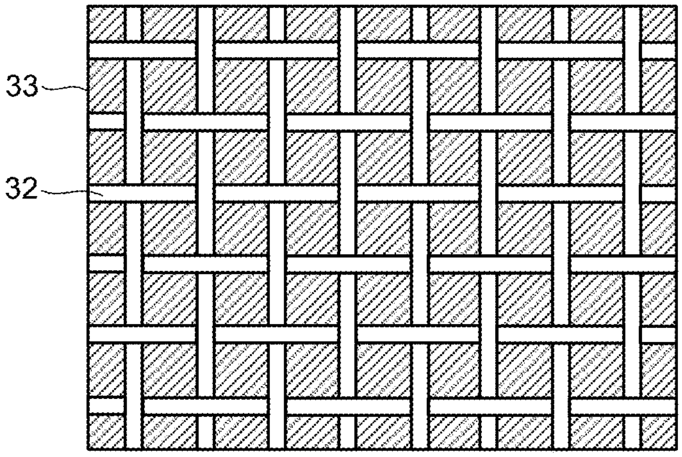
FIG. 15 is a plan view illustrating a first example (mesh sheet) of the sheet member having the openings.

FIG. 15 to FIG. 21 illustrate examples of the sheet member 9 having the openings. FIG. 15 illustrates an example of a mesh sheet member, and FIG. 16 to FIG. 21 are examples of a sheet member in which openings are formed in a sheet. In the mesh sheet member illustrated in FIG. 15, 32 denotes a mesh part (a warp yarn or a weft yarn), and 33 denotes an opening part (aperture part). In the sheet member 34 in which the openings are formed in the sheet as well, the shape of the openings 35 may be any of a round hole illustrated in FIG. 16 and FIG. 17, a square hole (polygonal hole) illustrated in FIG. 18, a hexagonal hole (polygonal hole) illustrated in FIG. 19, an elliptical hole illustrated in FIG. 20, a rectangular hole illustrated in FIG. 21, and so on. In FIG. 16 to FIG. 21, reference sign 36 denotes a sheet portion, and reference sign 37 denotes the shortest distance between the openings 35.

EXAMPLES

Hereinafter, examples and their evaluation results will be described.

Example 1, Comparative Example 1

As shown in Table 1 and Table 2, combinations of various couplants and holders were prepared, and performance evaluation was conducted using normal probes or angle probes with a 2.0 MHz frequency. "Shoe material of probe" in Table 1 and Table 2 is a material of a shoe in the case of the angle probe and a material of a retarder in the case of the normal probe. The items entered in Table 1 and Table 2 will be described. "Holder" is intended to mount a combination of an elastomer sheet and a mesh sheet member on a probe, and "With or without holder" indicates whether or not the holder is used in the test. As "Holder structure", those illustrated in FIG. 1 to FIG. 10 were used. "Mesh sheet fixed or not" indicates whether or not the mesh sheet member is fixed to the holder using an adhesive or an adhesive sheet or by a physical process or the like using a jig or the like. As "Mesh sheet member", those different in material, mesh yarn diameter, and an aperture indicating the distance between yarns were used, and the effect of the embodiment was confirmed. As "Elastomer", polystyrene-based thermoplastic elastomers (SBC, TPC) different in hardness and thickness were used.

First, the moving properties of ultrasonic inspection devices were evaluated. A shear tensile test was first conducted to examine whether or not the ultrasonic inspection devices (ultrasonic probes) with only their weight could be moved in the state in which a further load was not applied. The ultrasonic probes were each connected to a load cell, placed on a stainless plate with an 18 μm surface roughness Rz, and moved on the stainless plate at a low speed, and coefficients of static friction were measured. As comparative examples, the measurement was also conducted in the case where the holder was not used and in the case where the mesh sheet member was not fixed to the holder. As a result, in the case where the holder was not used and in the case where the mesh sheet member was not fixed to the holder, the coefficients of static friction were larger than those in the case where the mesh sheet member was fixed to the holder. In all the cases where holders in which various couplants were housed or fixed were used, it was found out that the coefficients of static frictions were small and the ultrasonic probes could be moved. In the cases where the holders illustrated in FIG. 12, FIG. 13, and FIG. 14 are used, the mesh sheet member is worked according to the shape of the holder into such a shape that the mesh sheet member is in contact with the surface of the object to be inspected. In these cases, the coefficients of static friction were larger than those in the cases where the mesh sheet member was installed along the surface of the object to be inspected as in the holders illustrated in FIG. 1 and FIG. 9. Table 1 and Table 2 show the results.

Next, an ultrasonic flaw detection test was conducted. A carbon steel block with a 300 mm length was prepared. The surface roughness Rz of a surface on which an ultrasonic wave was incident was 18 μm, and the surface roughness Rz of a surface on which the ultrasonic wave was reflected was 1.6 μm. The flaw detection test was conducted under the condition that an 18 kPa load was applied to the ultrasonic probes by an electromagnetic actuator to press the ultrasonic probes against the carbon steel block. Table 1 shows the test results together with the results of the coefficient of friction. A tendency was recognized that as the aperture ratio of the mesh sheet was larger, the amplitude of an echo waveform was larger and thus was more favorable. Using an elastomer whose Asker C hardness is large results in a small amplitude of the echo waveform, making the ultrasonic flaw detection difficult.

TABLE 1

| | | Holder | | | Mesh sheet member | | |
|---|---|---|---|---|---|---|---|
| Measurement No. | Shoe material of probe | With or without holder | Holder structure | Mesh sheet member fixed or not | Material | Yarn diameter [μm] | Aperture [μm] |
| 1 | Acrylic | Without | — | — | Polyester | 125 | 650 |
| 2 | Acrylic | With | FIGS. 1, 5 | Fixed | Polyester | 125 | 650 |
| 3 | Acrylic | With | FIGS. 1, 5 | Not fixed | Polyester | 125 | 650 |
| 4 | Acrylic | With | FIGS. 2, 6 | Fixed | Polyester | 125 | 650 |
| 5 | Acrylic | With | FIGS. 2, 6 | Not fixed | Polyester | 125 | 650 |
| 6 | — | With | FIGS. 3, 5 | Fixed | Polyester | 125 | 650 |
| 7 | — | With | FIGS. 3, 5 | Not fixed | Polyester | 125 | 650 |
| 8 | Acrylic | With | FIGS. 4, 6 | Fixed | Polyester | 125 | 650 |
| 9 | Polystyrene | With | FIGS. 4, 6 | Fixed | Polyester | 125 | 650 |
| 10 | Polyetherimide | With | FIGS. 4, 6 | Fixed | Polyester | 125 | 650 |
| 11 | Acrylic | With | FIGS. 4, 6 | Not fixed | Polyester | 125 | 650 |
| 12 | Acrylic | With | FIG. 7 | Fixed | Polyester | 125 | 650 |
| 13 | Acrylic | With | FIG. 7 | Not fixed | Polyester | 125 | 650 |
| 14 | Acrylic | With | FIG. 8 | Fixed | Polyester | 125 | 650 |
| 15 | Acrylic | With | FIG. 8 | Not fixed | Polyester | 125 | 650 |
| 16 | Acrylic | With | FIG. 9 | Fixed | Polyester | 125 | 650 |
| 17 | Acrylic | With | FIG. 9 | Not fixed | Polyester | 125 | 650 |
| 18 | Acrylic | With | FIG. 10 | Fixed | Polyester | 125 | 650 |
| 19 | Acrylic | With | FIG. 10 | Not fixed | Polyester | 125 | 650 |
| 20 | Acrylic | With | FIG. 1 | Fixed | Nylon | 350 | 1190 |
| 21 | Acrylic | With | FIG. 1 | Fixed | Nylon | 430 | 1400 |
| 22 | Acrylic | With | FIG. 1 | Fixed | Polyester | 71 | 246 |
| 23 | Acrylic | With | FIG. 1 | Fixed | Nylon | 280 | 990 |
| 24 | Acrylic | With | FIG. 1 | Fixed | Nylon | 500 | 1800 |
| 25 | Acrylic | With | FIG. 1 | Fixed | Polyester | 55 | 199 |
| 26 | Acrylic | With | FIG. 1 | Fixed | Polyester | 45 | 167 |
| 27 | Acrylic | With | FIG. 1 | Fixed | Polypropylene | 225 | 840 |
| 28 | Acrylic | With | FIG. 1 | Fixed | Polypropylene | 210 | 780 |
| 29 | Acrylic | With | FIG. 1 | Fixed | Polyester | 150 | 600 |
| 30 | Acrylic | With | FIG. 1 | Fixed | Polyester | 250 | 1000 |
| 31 | Acrylic | With | FIG. 1 | Fixed | Fluororesin | 250 | 1020 |

| | Elastomer | | Coefficient of static friction under | Amplitude of echo |
|---|---|---|---|---|
| Measurement No. | Hardness Asker C | Thickness [mm] | no bad condition | waveform (arb. units) |
| 1 | 2 | 0.5 | 0.3 | 2.7 |
| 2 | 2 | 0.5 | 0.18 | 3 |
| 3 | 2 | 0.5 | 0.25 | 2.7 |
| 4 | 2 | 0.5 | 0.18 | 2.8 |
| 5 | 2 | 0.5 | 0.26 | 2.5 |
| 6 | 2 | 0.5 | 0.18 | 2.8 |
| 7 | 2 | 0.5 | 0.25 | 2.5 |
| 8 | 2 | 0.5 | 0.2 | 3 |
| 9 | 2 | 0.5 | 0.2 | 3.5 |
| 10 | 2 | 0.5 | 0.2 | 3.8 |
| 11 | 2 | 0.5 | 0.2 | 2.8 |
| 12 | 2 | 0.5 | 0.25 | 2.4 |
| 13 | 2 | 0.5 | 0.25 | 2 |
| 14 | 2 | 0.5 | 0.14 | 3.7 |
| 15 | 2 | 0.5 | 0.15 | 3.5 |
| 16 | 2 | 0.5 | 0.28 | 2.2 |
| 17 | 2 | 0.5 | 0.28 | 2 |
| 18 | 2 | 0.5 | 0.3 | 1.7 |
| 19 | 2 | 0.5 | 0.3 | 1.3 |
| 20 | 2 | 0.5 | 0.15 | 3.1 |
| 21 | 2 | 0.5 | 0.15 | 3 |

TABLE 1-continued

| | | | | |
|---|---|---|---|---|
| 22 | 2 | 0.5 | 0.28 | 3.1 |
| 23 | 2 | 0.5 | 0.18 | 3.2 |
| 24 | 2 | 0.5 | 0.15 | 3.2 |
| 25 | 2 | 0.5 | 0.3 | 3.2 |
| 26 | 2 | 0.5 | 0.32 | 3.2 |
| 27 | 2 | 0.5 | 0.17 | 3.2 |
| 28 | 2 | 0.5 | 0.17 | 3.2 |
| 29 | 2 | 0.5 | 0.24 | 3.3 |
| 30 | 2 | 0.5 | 0.18 | 3.3 |
| 31 | 2 | 0.5 | 0.15 | 3.4 |

TABLE 2

| | | Holder | | | Mesh sheet member | | |
|---|---|---|---|---|---|---|---|
| Measurement No. | Shoe material of probe | With or without holder | Holder structure | Mesh sheet member fixed or not | Material | Yarn diameter [μm] | Aperture [μm] |
| 32 | Acrylic | With | FIG. 1 | Fixed | Polyester | 250 | 600 |
| 33 | Acrylic | With | FIG. 1 | Fixed | Polyester | 260 | 580 |
| 34 | Acrylic | With | FIG. 1 | Fixed | Polyester | 280 | 810 |
| 35 | Acrylic | With | FIG. 1 | Fixed | Polyester | 300 | 800 |
| 36 | Acrylic | With | FIG. 1 | Fixed | Polyester | 300 | 1000 |
| 37 | Acrylic | With | FIG. 1 | Fixed | Polyester | 350 | 1200 |
| 38 | Acrylic | With | FIG. 1 | Fixed | Polyester | 400 | 870 |
| 39 | Acrylic | With | FIG. 1 | Fixed | Polyester | 400 | 1160 |
| 40 | Acrylic | With | FIG. 1 | Fixed | Polyester | 410 | 1404 |
| 41 | Acrylic | With | FIG. 1 | Fixed | Polyester | 500 | 1000 |
| 42 | Acrylic | With | FIG. 1 | Fixed | Polyethylene | 86 | 125/163 |
| 43 | Acrylic | With | FIG. 1 | Fixed | Polyethylene | 86 | 76/168 |
| 44 | Acrylic | With | FIG. 1 | Fixed | Polyethylene | 86 | 90/168 |
| 45 | Acrylic | With | FIG. 1 | Fixed | Polyethylene | 345 | 1242 |
| 46 | Acrylic | With | FIG. 1 | Fixed | Polyethylene | 545 | 3083 |
| 47 | Acrylic | With | FIG. 1 | Fixed | Polyethylene | 770 | 4310 |
| 48 | Acrylic | With | FIG. 1 | Fixed | Polyethylene | 106/122 | 158/212 |
| 49 | Acrylic | With | FIG. 1 | Fixed | Polyethylene | 86/106 | 140/176 |
| 50 | Acrylic | With | FIG. 1 | Fixed | Polypropylene | 320 | 500 |
| 51 | Acrylic | With | FIG. 1 | Fixed | Polypropylene | 125 | 100 |
| 52 | Acrylic | With | FIG. 1 | Fixed | Polypropylene | 176 | 50 |
| 53 | Acrylic | With | FIG. 1 | Fixed | Polyester | 71 | 292 |
| 54 | Acrylic | With | FIG. 1 | Fixed | Polypropylene | 250 | 1030 |
| 55 | Acrylic | With | FIG. 1 | Fixed | Polyester | 145 | 700 |
| 56 | Acrylic | With | FIG. 1 | Fixed | Polyethylene | 150 | 750 |
| 57 | Acrylic | With | FIG. 1 | Fixed | Fluorine mesh | 400 | 2140 |
| 58 | Acrylic | With | FIG. 1 | Fixed | Polyester | 125 | 650 |
| 59 | Acrylic | With | FIG. 1 | Fixed | Polyester | 125 | 650 |
| 60 | Acrylic | With | FIG. 1 | Fixed | Polyester | 125 | 650 |
| 61 | Polystyrene | With | FIG. 1 | Fixed | Polyester | 125 | 650 |
| 62 | Polyetherimide | With | FIG. 1 | Fixed | Polyester | 125 | 650 |

| | Elastomer | | Coefficient of static friction under | Amplitude of echo |
|---|---|---|---|---|
| Measurement No. | Hardness Asker C | Thickness [mm] | no bad condition | waveform (arb. units) |
| 32 | 2 | 0.5 | 0.24 | 2.6 |
| 33 | 2 | 0.5 | 0.24 | 2.5 |
| 34 | 2 | 0.5 | 0.16 | 2.9 |
| 35 | 2 | 0.5 | 0.17 | 2.8 |
| 36 | 2 | 0.5 | 0.15 | 3.1 |
| 37 | 2 | 0.5 | 0.15 | 3.1 |
| 38 | 2 | 0.5 | 0.17 | 2.4 |
| 39 | 2 | 0.5 | 0.15 | 2.9 |
| 40 | 2 | 0.5 | 0.15 | 3.1 |
| 41 | 2 | 0.5 | 0.15 | 2.3 |
| 42 | 2 | 0.5 | 0.32 | 2.2 |
| 43 | 2 | 0.5 | 0.32 | 2.3 |
| 44 | 2 | 0.5 | 0.32 | 2.3 |
| 45 | 2 | 0.5 | 0.15 | 3.2 |
| 46 | 2 | 0.5 | 0.15 | 3.8 |
| 47 | 2 | 0.5 | 0.15 | 3.7 |
| 48 | 2 | 0.5 | 0.15 | 2.1 |
| 49 | 2 | 0.5 | 0.15 | 2 |

TABLE 2-continued

| | | | | |
|---|---|---|---|---|
| 50 | 2 | 0.5 | 0.25 | 1.9 |
| 51 | 2 | 0.5 | 0.35 | 1 |
| 52 | 2 | 0.5 | 0.39 | 0.3 |
| 53 | 2 | 0.5 | 0.27 | 3.4 |
| 54 | 2 | 0.5 | 0.15 | 3.4 |
| 55 | 2 | 0.5 | 0.21 | 3.6 |
| 56 | 2 | 0.5 | 0.2 | 3.6 |
| 57 | 2 | 0.5 | 0.15 | 3.7 |
| 58 | 2 | 1 | 0.22 | 3.2 |
| 59 | 5 | 0.5 | 0.22 | 3 |
| 60 | 5 | 1 | 0.22 | 1.5 |
| 61 | 2 | 1 | 0.22 | 3.9 |
| 62 | 2 | 1 | 0.22 | 4.1 |

Example 2, Comparative Example 2

As shown in Table 3, combinations of various couplants and holders were prepared, and performance evaluation was conducted using normal probes or angle probes with a 3.5 MHz frequency. "Shoe material of probe" in Table 3 is a material of a shoe in the case of the angle probe and a material of a retarder in the case of the normal probe. The items entered in Table 3 will be described. "Holder" is intended to mount a combination of an elastomer sheet and a sheet having a plurality of openings on a probe, and "With or without holder" indicates whether or not the holder is used in the test. As "Holder structure", those illustrated in FIG. 1 to FIG. 10 were used. "Sheet member fixed or not" indicates whether or not the sheet containing a polymer and having the openings is fixed to the holder using an adhesive or an adhesive sheet or by a physical process or the like using a jig or the like. As "Sheet member", those different in material, opening shape, bulge width or inter-opening distance, and inter-bulge distance or opening diameter were used, and the effect of the embodiment was confirmed. Table 3 also shows the material, hardness, and thickness of each elastomer used.

First, the moving properties of ultrasonic inspection devices were evaluated. A shear tensile test was first conducted to examine whether or not the ultrasonic inspection devices (ultrasonic probes) with only their weight could be moved in the state in which a further load was not applied. The ultrasonic probes were each connected to a load cell, placed on an aluminum plate with a 35 μm surface roughness Rz, and moved on the aluminum plate at a low speed, and coefficients of static friction were measured. As comparative examples, the measurement was also conducted in the case where the holder was not used and in the case where the sheet member was not fixed to the holder. As a result, in the case where the holder was not used and in the case where the sheet member was not fixed to the holder, the coefficients of static friction were larger than those in the cases where the sheet member was fixed to the holder. In all the cases where holders in which various couplants were housed or fixed were used, it was found out that the coefficients of static friction were small and thus the ultrasonic probes could be moved. Table 3 shows the evaluation results together with the measurement conditions.

Next, an ultrasonic flaw detection test was conducted. A carbon steel block with a 300 mm length was prepared. The surface roughness Rz of a surface on which an ultrasonic wave was incident was 18 μm, and the surface roughness Rz of a surface on which the ultrasonic wave was reflected was 1.6 μm. The flaw detection test was conducted under the condition that an 18 kPa load was applied to the ultrasonic probes by an electromagnetic actuator to press the ultrasonic probes against the carbon steel block. Table 3 shows the test results together with the results of the coefficient of friction. A tendency was recognized that as the inter-bulge distance or the opening diameter of the sheet member was larger, the amplitude of an echo waveform was larger and thus was more favorable.

TABLE 3

Figure 16:
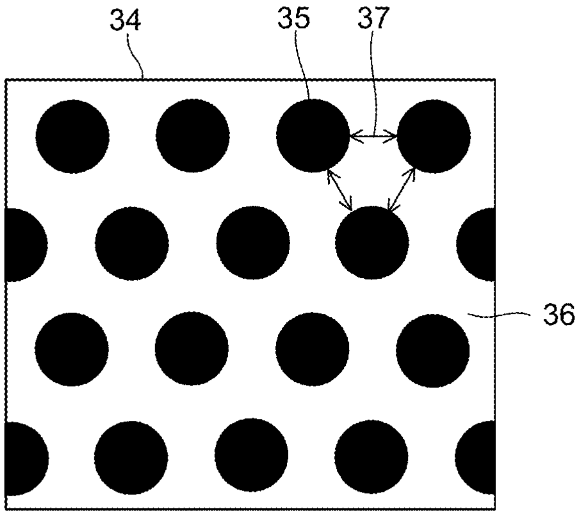
FIG. 16 is a plan view illustrating a second example of the sheet member having the openings.
Figure 17:
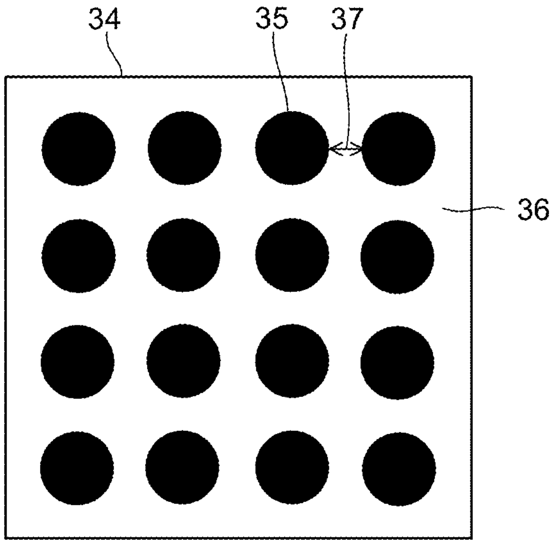
FIG. 17 is a plan view illustrating a third example of the sheet member having the openings.
Figure 18:
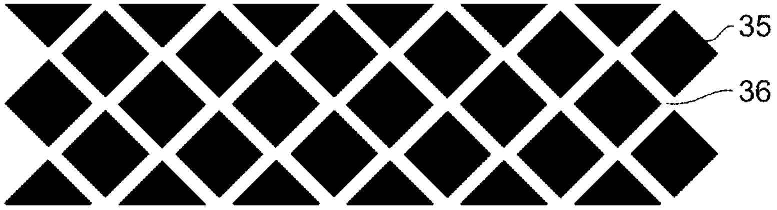
FIG. 18 is a plan view illustrating a fourth example of the sheet member having the openings.
Figure 19:
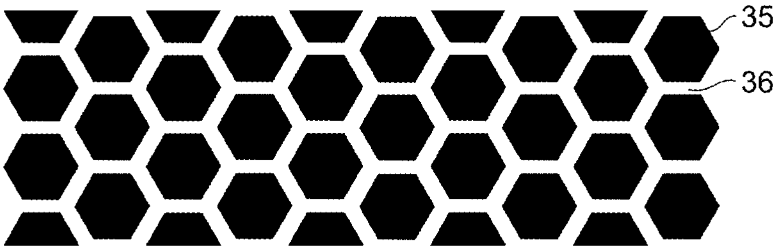
FIG. 19 is a plan view illustrating a fifth example of the sheet member having the openings.
Figure 20:
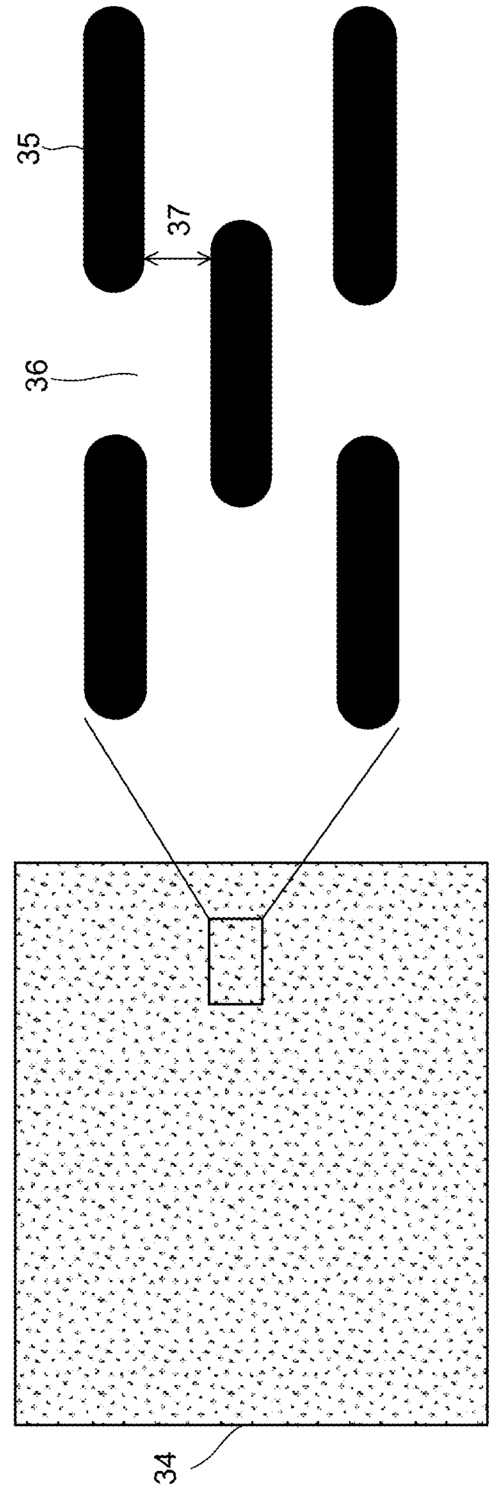
FIG. 20 is a plan view illustrating a sixth example of the sheet member having the openings.
Figure 21:
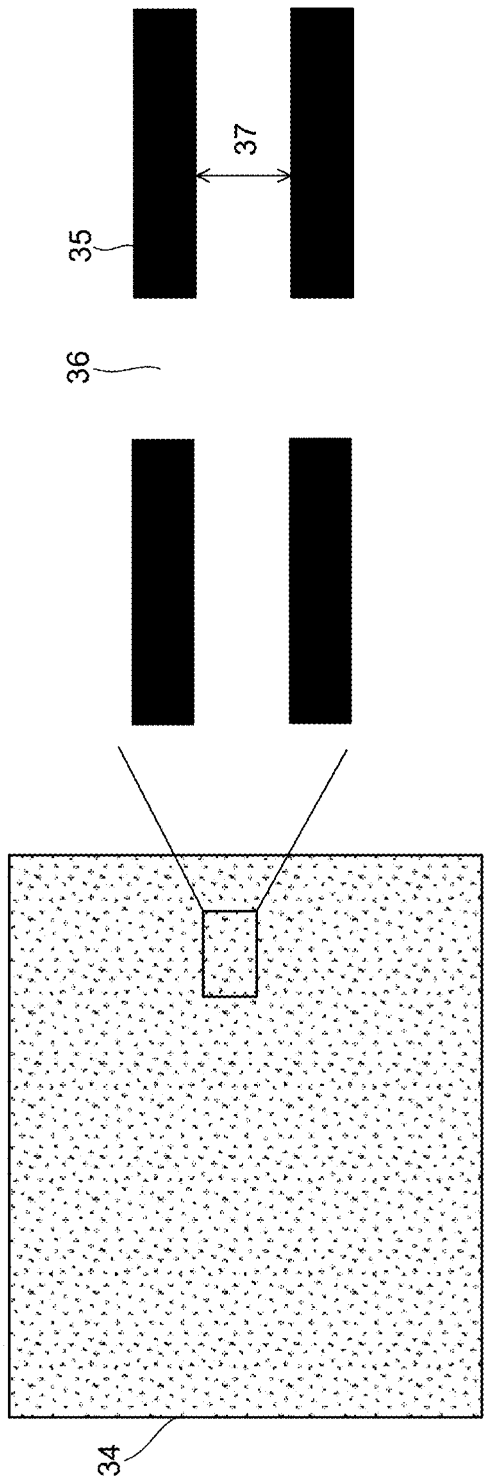
FIG. 21 is a plan view illustrating a seventh example of the sheet member having the openings.

| | | Holder | | | Sheet member | | | | |
|---|---|---|---|---|---|---|---|---|---|
| Measurement No. | Shoe material of probe | With or without holder | Holder structure | Sheet member fixed or not | FIG. showing shape | Sheet thickness [mm] | Material | Bulge width or inter-opening distance [μm] | Inter-bulge distance or opening diameter [μm] |
| 63 | Acrylic | Without | — | Not fixed | FIG. 16 | 0.2 | PTFE | 150 | 650 |
| 64 | Acrylic | With | FIG. 1 | Not fixed | FIG. 16 | 0.2 | PTFE | 150 | 650 |
| 65 | Polystyrene | With | FIG. 1 | Not fixed | FIG. 16 | 0.2 | PTFE | 150 | 650 |
| 66 | Acrylic | With | FIG. 1 | Fixed | FIG. 16 | 0.2 | PTFE | 150 | 650 |
| 67 | Acrylic | With | FIG. 7 | Fixed | FIG. 16 | 0.2 | PTFE | 150 | 650 |
| 68 | Acrylic | With | FIG. 5 | Fixed | FIG. 17 | 0.2 | PTFE | 150 | 650 |
| 69 | Acrylic | With | FIG. 1 | Not fixed | FIG. 18 | 0.2 | PTFE | 150 | 750 |
| 70 | Acrylic | With | FIG. 1 | Fixed | FIG. 18 | 0.2 | Polyester | 150 | 650 |
| 71 | Acrylic | With | FIG. 1 | Fixed | FIG. 19 | 0.2 | PTFE | 150 | 650 |
| 72 | Acrylic | With | FIG. 7 | Fixed | FIG. 19 | 0.5 | Polyester | 150 | 650 |
| 73 | Acrylic | With | FIG. 5 | Fixed | FIG. 20 | 0.2 | PTFE | 150 | 900 |
| 74 | Acrylic | With | FIG. 1 | Fixed | FIG. 21 | 0.2 | PTFE | 150 | 900 |

TABLE 3-continued

| Measurement No. | Elastomer Material | Hardness Asker C | Thickness [mm] | Coefficient of static friction under no bad condition | Amplitude of echo waveform (arb. units) |
|---|---|---|---|---|---|
| 63 | Styrene-based thermoplastic elastomer | 2 | 1.0 | 0.62 | 0.8 |
| 64 | Styrene-based thermoplastic elastomer | 2 | 1.0 | 0.67 | 1.4 |
| 65 | Styrene-based thermoplastic elastomer | 2 | 1.0 | 0.56 | 2.1 |
| 66 | Styrene-based thermoplastic elastomer | 2 | 1.0 | 0.24 | 3.2 |
| 67 | Olefin-based thermoplastic elastomer | 2 | 0.5 | 0.16 | 3.1 |
| 68 | Styrene-based thermoplastic elastomer | 2 | 0.5 | 0.17 | 2.8 |
| 69 | Styrene-based thermoplastic elastomer | 2 | 0.5 | 0.62 | 1.2 |
| 70 | Styrene-based thermoplastic elastomer | 2 | 0.5 | 0.15 | 2.9 |
| 71 | Olefin-based thermoplastic elastomer | 2 | 0.5 | 0.17 | 2.7 |
| 72 | Styrene-based thermoplastic elastomer | 2 | 0.5 | 0.15 | 2.9 |
| 73 | Styrene-based thermoplastic elastomer | 2 | 0.5 | 0.15 | 3.2 |
| 74 | Olefin-based thermoplastic elastomer | 2 | 0.5 | 0.15 | 2.9 |

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A sonic inspection device comprising:

a sonic probe including a transducer configured to execute at least one of transmission and reception of a sound wave, the sonic probe having a sonic function surface constituting at least one of a transmitting surface of the sound wave and a receiving surface of the sound wave;

a couplant that includes an elastomer and a sheet member containing a polymer and having a plurality of openings, the elastomer having a first surface that comes into contact with the sonic function surface of the sonic probe directly or through an intermediate member and a second surface opposite the first surface, and the sheet member being stacked with the elastomer while in contact with the second surface;

a holder that holds the couplant to attach the couplant to the sonic probe and to which the sheet member is partly fixed while the sheet member is at least partly located at an outermost surface under no load condition or under loaded condition; and a loading mechanism that applies a load to the sonic probe, wherein the holder includes:

a pressing member having a first opening part where to insert the sonic probe movably; and a base member having a second opening part where to house the elastomer, the second opening part communicating with the first opening part, and the sheet member is bonded and fixed to a lower end surface of the base member.

2. The device according to claim 1, wherein the sheet member is bonded and fixed to a projecting part provided on a lower end of the second opening part and extending inward.

3. The device according to claim 1, wherein the sheet member is bonded and fixed by an adhesive sheet disposed in a space provided on an outer peripheral side between the base member and the sheet member.

4. The device according to claim 1, wherein the elastomer and the sheet member are sandwiched between the base member and the pressing member to be fixed.

5. The device according to claim 1, wherein the holder includes a plurality of plungers provided on the pressing member to fix the sonic probe attachably/detachaly by pressing tips of the plungers against an outer surface of the sonic probe.

6. The device according to claim 1, wherein the holder includes: a sidewall part having an opening part where to insert the sonic probe movably and where to house the elastomer; and a plurality of plungers provided on the sidewall part to fix the sonic probe attachably/detachably by pressing tips of the plungers against an outer surface of the sonic probe, and wherein the sheet member is bonded and fixed to a lower end surface of the sidewall part.

7. A sonic inspection method using the sonic inspection device according to claim 1, the method comprising:

placing the sonic inspection device on an object to be inspected;

applying a load to the sonic probe to press the elastomer to bring the elastomer into contact with the object through the sheet member;

performing a sonic nondestructive inspection of the object using the sonic probe while pressing the elastomer against the object; and removing the load applied to the couplant and moving the sonic inspection device on the object while keeping the sheet member in contact with the object.

8. A holder for a sonic inspection device, the holder comprising:

a couplant including an elastomer and a sheet member containing a polymer and having a plurality of openings;

an opening part where to insert a sonic probe;

a part to house or hold the couplant with the sheet member at least partly being located at an outermost surface under no load condition or under loaded condition;

a pressing member having a first opening part where to insert the sonic probe movably; and a base member having a second opening part where to house the elastomer, the second opening part communicating with the first opening part, wherein the base member has a lower end surface, and the sheet member is bonded and fixed to the lower end surface of the base member.

9. The holder according to claim 8, wherein the sheet member is bonded and fixed to a projecting part provided on a lower end of the second opening part and extending inward.

10. The holder according to claim 8, further comprising a plurality of plungers that are provided on the pressing member to fix the sonic probe attachably/detachably by pressing tips of the plungers against an outer surface of the sonic probe.

11. The holder according to claim 8, comprising:

a sidewall part having an opening part where to insert the sonic probe movably and where to house the elastomer; and a plurality of plungers provided on the sidewall part to fix the sonic probe attachably/detachably by pressing tips of the plungers against an outer surface of the sonic probe, wherein the sheet member having the openings is bonded and fixed to a lower end surface of the sidewall part.

* * * * *